(12) United States Patent
Gonzalez

(10) Patent No.: US 8,671,073 B2
(45) Date of Patent: Mar. 11, 2014

(54) SYNCHRONIZING HUMAN RESOURCE DATABASE WITH AUTHORIZATION DATABASE

(75) Inventor: Christopher M. Gonzalez, Saint Petersburg, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 13/069,661

(22) Filed: Mar. 23, 2011

(65) Prior Publication Data

US 2012/0246112 A1    Sep. 27, 2012

(51) Int. Cl.
G06F 17/30    (2006.01)

(52) U.S. Cl.
USPC .......................................... 707/610; 707/781

(58) Field of Classification Search
USPC ................................. 707/610, 781
See application file for complete search history.

(56) References Cited

U.S. PATENT DOCUMENTS

| | | | |
|---|---|---|---|
| 2002/0188667 A1* | 12/2002 | Kirnos | 709/203 |
| 2005/0289342 A1* | 12/2005 | Needham et al. | 713/169 |
| 2006/0074851 A1* | 4/2006 | Nagai et al. | 707/1 |
| 2006/0106881 A1* | 5/2006 | Leung et al. | 707/200 |
| 2007/0094716 A1* | 4/2007 | Farino et al. | 726/5 |
| 2007/0299887 A1* | 12/2007 | Novik et al. | 707/203 |
| 2011/0162046 A1* | 6/2011 | Forster et al. | 726/4 |

OTHER PUBLICATIONS

Article entitled "Merging Flat Files Directly", dated Aug. 12, 2003, by Patten.*
Wayback Citation for "Merging Flat Files Directly" by Internet Archive.*

* cited by examiner

*Primary Examiner* — Mahesh Dwivedi

(57) ABSTRACT

A method may include storing a first database including a first plurality of user identifiers (IDs) and corresponding privileges for accessing network resources associated with an organization. The method may also include storing a second database, different than the first database, including the first plurality of user IDs. The method may also include storing a third database, different than the first database and second database, including a second plurality user IDs associated with the organization. Further, the method may include removing, from the first database, privileges associated with user IDs appearing in the second database but not in the third database.

20 Claims, 11 Drawing Sheets

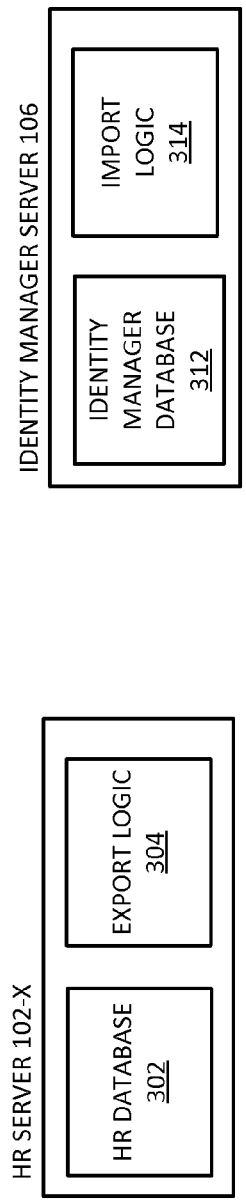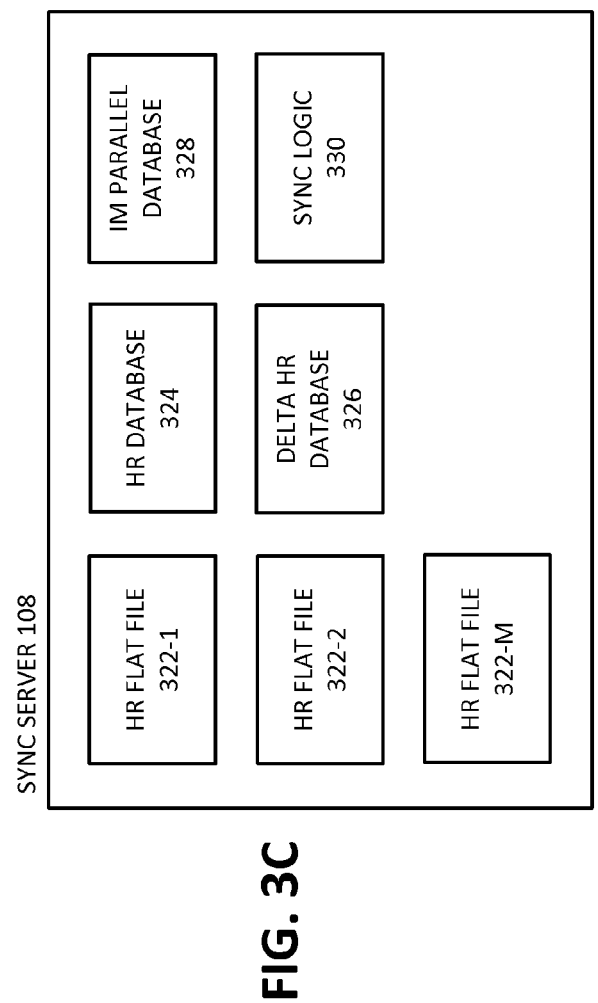

IM DATABASE 312

| USER ID 402 | EMPLOYEE ID 404 | UPDATED 406 | ROLES 408 | MGR. EMPLOYEE ID 410 |
|---|---|---|---|---|
| MARY | 123987 | 2011-01-31 | IT | 562875 |
| CHUCK | 456321 | 2011-01-31 | HR, INVENTORY DB | 652978 |

HR DATABASE 324

| EMPLOYEE ID 422 | UPDATED 424 | TAXPAYER ID 426 | GIVEN NAME 428 | FAMILY NAME 430 | MGR. EMPLOYEE ID 432 | MGR. FLAG 434 |
|---|---|---|---|---|---|---|
| 123987 | 2011-02-14 | 154-98-8945 | MARY | SMITH | 562875 | TRUE |
| 456321 | 2011-01-13 | 143-70-4769 | CHUCK | JONES | 652978 | TRUE |

DELTA DATABASE 326

| EMPLOYEE ID 442 | UPDATED 444 | TAXPAYER ID 446 | GIVEN NAME 448 | FAMILY NAME 450 | MGR. EMPLOYEE ID 452 | MGR. FLAG 454 |
|---|---|---|---|---|---|---|
| 123987 | 2011-02-14 | 154-98-8945 | MARY | SMITH | 562875 | TRUE |

• • •

| PARALLEL DATABASE 328 | | | | | |
|---|---|---|---|---|---|
| USER ID 462 | EMPLOYEE ID 464 | UPDATED 466 | ROLES 468 | MGR. EMPLOYEE ID 470 | MGR. FLAG 472 |
| MARY | 123987 | 2011-01-31 | IT | 562875 | TRUE |
| CHUCK | 456321 | 2011-01-31 | HR, INVENTORY DB | 652978 | TRUE |

SYNCHRONIZING HUMAN RESOURCE DATABASE WITH AUTHORIZATION DATABASE

BACKGROUND INFORMATION

Business concerns (e.g., companies, corporations, firms, etc.) typically have a database and database software for tracking employee information. The employee information may be maintained in the database by employees in the Human Resources (HR) department, for example. The same business concerns may also have a database and database software to track and control the authorization and access to various corporate servers by employees. The authentication and access database may be maintained by employees in the Information Technology (IT) department.

BRIEF DESCRIPTION OF THE DRAWINGS

FIG. 3A is a block diagram of exemplary components of the human resources (HR) server of FIG. 1;

FIG. 3B is a block diagram of exemplary components of the identity manager (IM) server of FIG. 1;

FIG. 3C is a block diagram of exemplary components of the sync server of FIG. 1;

FIG. 4A is a block diagram of an exemplary IM database of FIG. 3B;

FIG. 4B is a block diagram of an exemplary HR database of FIG. 3C;

FIG. 4C is a block diagram of an exemplary delta database of FIG. 3C;

FIG. 4D is a block diagram of an exemplary parallel DB of FIG. 3C;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein allow for information about privileges for accessing network resources by employees to be updated from human resource (HR) information stored in an HR database. In one embodiment, if data about an employee is removed from the HR database (e.g., the former employee is no longer employed) then privileges associated with the employee may automatically be revoked from the IT database. Likewise, if the identity of an employee's manager changes in the HR database, then emails to grant privileges to the employee may be sent to the employee's new manager automatically. These and other embodiments are described below.

Figure 1:
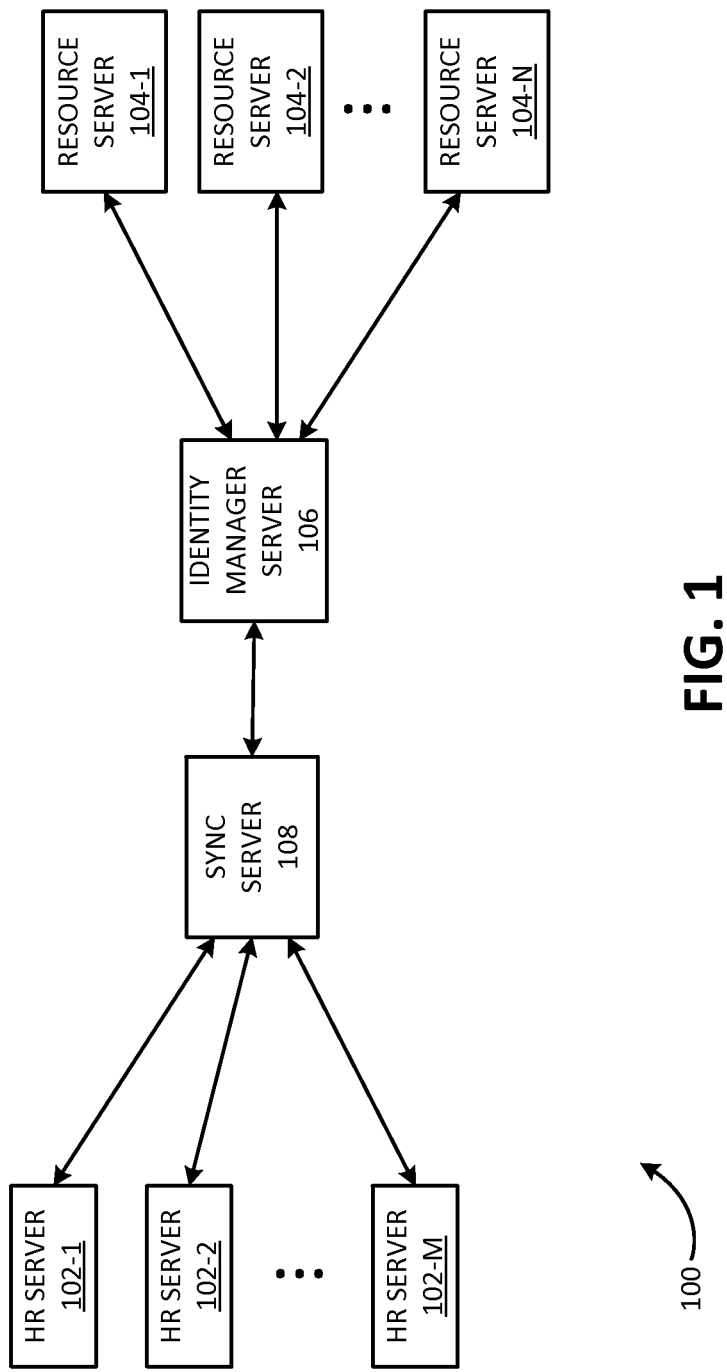
FIG. 1 is a diagram of an exemplary network for implementing the embodiments described herein.

FIG. 1 is a diagram of an exemplary network 100 for implementing embodiments disclosed herein. Network 100 may include a number (M) of Human Resource (HR) servers 102 (individually, "HR server 102-x"), a number (N) of resource servers 104 (individually, "resource server 104-x"), an identity manager (IM) server 106, and a sync server 108. In the example of FIG. 1, HR servers 102 may be used by an employer, such as a company or a corporation, to manage employee information. IM server 106 may be used by the employer to manage employee privileges (e.g., authorization) to access corporate resource servers 104. Sync server 108 may sync information between the HR servers 102 and IM server 106, for example.

HR server 102-x may include one or more computers for hosting programs, such as a human resources database (e.g., a MySQL database) or other applications. Each HR server 102-x may be located in a different part of a company (e.g., different cities or different offices). Each HR server 102-x may include a different type of database software, available from different vendors, to track employee information. Employee information, for example, may include the employee's tax ID (e.g., a social security number), employee ID, name, home address, business address, manager name, salary, etc.

Resource servers 104 may include the employer's information technology (IT) infrastructure resources. For example, resource servers 104 may include email servers, web servers, intranet servers, code repositories, etc., that are hosted by an employer for employees to use. An employee may be authorized (or not authorized) to access resource server 104-x. For example, for a user to access an email server, the employee may be provisioned with an email account on the email server. When an employee no longer works for the employer, the authorization may be revoked. Employees may be grouped into different roles and different roles may have access to different groups of resource servers 104. For example, an employee in the IT department may be given authorization to access a different set of resource servers 104 than an employee in the HR department.

IM server 106 may include one or more computers for hosting programs, such as a identity management database (e.g., a MySQL database) or other applications. IM server 106 may track employees and privileges that employees have for accessing resource servers 104. In one embodiment, IM server 106 may track roles assigned to employees and the privileges (e.g., authorizations) associated with the roles. In one embodiment, when an employee requests authorization to access a resource server 104-x, IM server 106 may send an email to the employee's manager (or other appropriate person) to grant the requested authorization. IM server 106 may record authorization (e.g., associate an authorization with an employee's record), for example, after the manager approves the request. IM server 106 may also be referred to as an "authorization database."

Sync server 108 may include one or more computers for hosting programs, including synching logic to synchronize information between HR servers 102 and IM server 106. For example, when an employee leaves employment, this information may be conveyed from HR server 102-x to IM server 106 through sync server 108. In turn, IM server 106 may revoke privileges granted to the departed employee. As another example, if the identity of an employee's manager changes, then this information may be conveyed from HR server 102-x to IM server 106 through sync server 108. In this case, when the employee seeks authorization to access resource server 104-x, IM server 106 may send an email to the appropriate manager to approve the authorization.

Devices in network 100 may be connected to each other through one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. In other embodiments, devices in network 100 may be connected to each other through a circuit switched network. Network 100 may allow any device to communicate (wireless or wired) with any other device directly or indirectly.

The exemplary configuration of devices in network 100 is illustrated for simplicity. Network 100 may include more devices, fewer devices, or a different configuration of devices than illustrated in FIG. 1. For example, network 100 may include more than one IM server 106. As another example, the devices in network 100 may be replicated for additional employers. That is, the configuration of network 100 is for an exemplary employer but other employers may adopt the same configuration of network 100. In some embodiments, the functions performed by two or more devices may be performed by any one device (e.g., one device may include sync server 108 and IM server 106). Likewise, in some embodiments, the functions performed by any one device may be performed by multiple devices.

Figure 2:
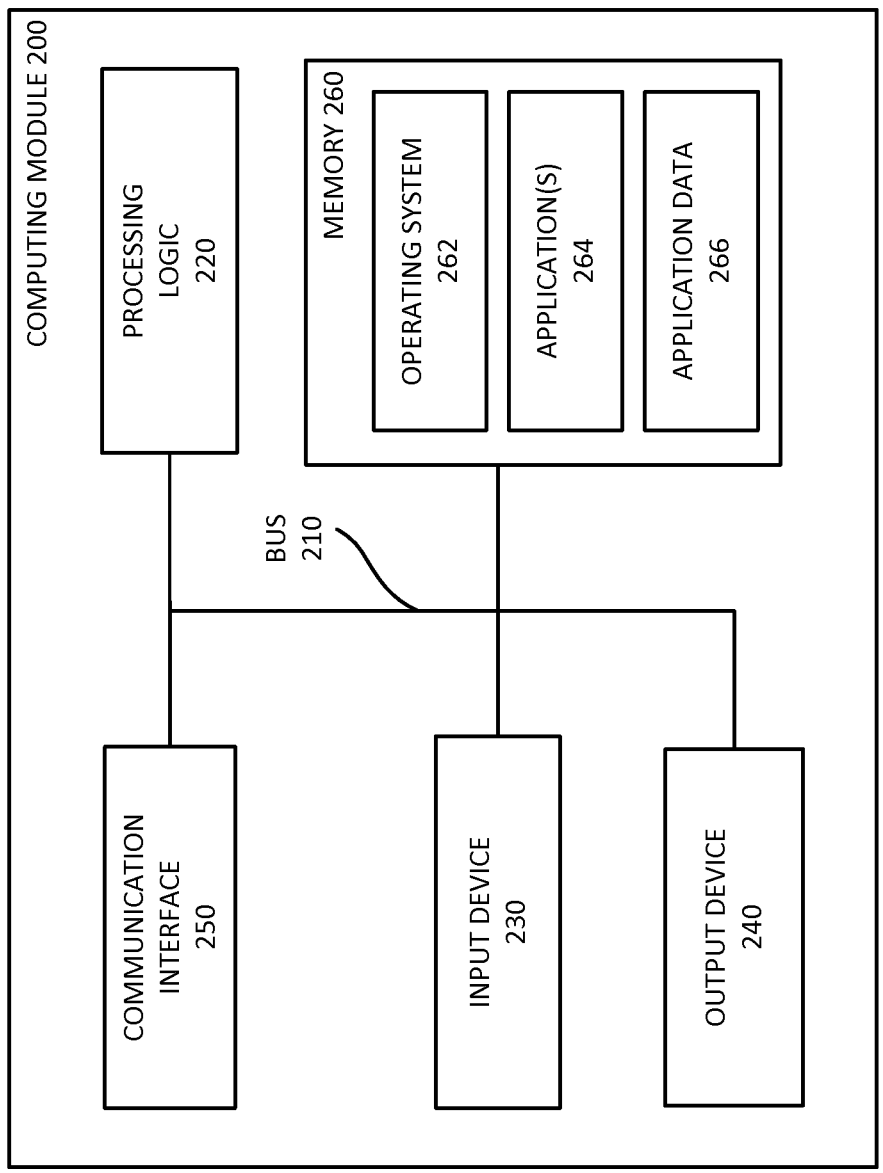
FIG. 2 is a block diagram of exemplary components of a computing module in the devices of FIG. 1.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), etc.

Input device 230 may allow a user to input information into computing module 200. Input device 230 may include a keyboard, a mouse, a pen, a microphone, a remote control (e.g., remote control 160), an audio capture device, an image and/or video capture device, a touch-screen display, etc. Some devices in network 100, such as servers in data center 110, may be managed remotely and may not include input device 230. In other words, some devices may be "headless" and may not include a keyboard, for example.

Output device 240 may output information to the user. Output device 240 may include a display, a printer, a speaker, etc. For example, a television or a personal computer may include a display (an output device), which may include a liquid-crystal display (LCD) for displaying content to the user. As another example, an optical network terminal (ONT) or a set-top box (STB) may include light-emitting diodes (LEDs). Headless devices, such as servers, may be managed remotely and may not include output device 240.

Input device 230 and output device 240 may allow a user to activate and interact with a particular service or application, such as a web browser or an application to search for and discover content. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Solaris, Windows, OS X, etc. Applications 264 and application data 266 may provide network services or include applications, depending on the device in which the particular computing module 200 is found.

Computing module 200 may perform the operations described herein in response to processing logic 220 executing software instructions stored in a computer-readable medium, such as memory 260. A computer-readable medium may include a physical (i.e., tangible) and/or logical memory device. The software instructions may be read into memory 260 from another computer-readable medium or from another device via communication interface 250. The software instructions stored in memory 260 may cause processing logic 220 to perform processes that are described herein.

As described above with respect to FIG. 1, HR server 102-*x* may provide human resource services to a portion of a company. FIG. 3A is a block diagram of exemplary components HR server 102-*x* (e.g., functions performed by application 264 in processing logic 220 or stored in memory 260 of HR server 102-*x*). As shown in FIG. 3A, HR server 102-*x* may include an HR database 302 and export logic 304. HR server 102-*x* may include more, fewer, or a different arrangement of components than shown in FIG. 3A.

HR database 302 may store information about employees of a company. HR database 302 may include records (e.g., one for each employee) with various fields. These fields may include, for example, the employee's name, employee ID, a taxpayer ID, the name and ID of the employee's manager, the employee's home address, etc. In one embodiment, HR database 302 may also record the last time information for a particular employee was updated and/or changed.

Export logic 304 may take the information in HR database 302 and export all or some of the information to a file format that is more universal than HR database 302. For example, export logic 304 may output the information in HR database in a comma-separated value (CSV) format. In this format, fields and records of a database may be separated by commas. Such an output may be referred to as a "flat file."

As described above with respect to FIG. 1, IM server 106 may provide services for authorizing users to access resource servers 104. FIG. 3B is a block diagram of exemplary components IM server 106 (e.g., functions performed by application 264 in processing logic 220 or stored in memory 260 of IM server 106). As shown in FIG. 3B, IM server 106 includes an identity manager (IM) database 312 and import logic 314.

IM server 106 may include more, fewer, or a different arrangement of components than shown in FIG. 3B.

IM database 302 may store information about the users (e.g., employees) and the associated roles, authorizations, or privileges granted to users. FIG. 4A is a block diagram of exemplary IM database 312. As shown, IM database 312 may include a user ID field 402, an employee ID field 404, an updated field 406, a roles field 408, and a manager employee ID field 410.

User ID field 402 may identify (e.g., uniquely) the user that may be granted privileges (e.g., authorizations) to access resource servers 104. Employee ID field 404 may also identify (e.g., uniquely) an employee. In one embodiment, employee ID field 404 and user ID field 402 may be combined into one field, or one of the fields may be omitted entirely.

Updated field 406 may indicate the time and/or date that the record corresponding to the user ID was last updated. Roles field 408 may indicate the roles (e.g., privileges, authorizations, etc.) associated with the corresponding user. For example, a role of "IT" may indicate that the corresponding user may have the privileges associated with someone in the Information Technology department. As another example, the role of "HR" may indicate that the corresponding user may have the privileges associated with someone in the Human Resources department. The privileges associated with a role may be defined in another table, not shown. Specific privileges may be defined in roles field 408 as well. For example, role field 408 may specify "inventory DB" if the user has privileges to the inventory DB server.

Manager employee ID field 410 may identify (e.g., uniquely) the record of the corresponding employee's manager. In one embodiment, manager employee ID field 410 may uniquely identify more than one record corresponding to the employee's managers.

Import logic 314 may allow for the updating of records in IM database 312. In one embodiment, sync server 108 may communicate with IM manager using Lightweight Directory Access Protocol (LDAP) for updating records in IM database 312.

As described above with respect to FIG. 1, sync server 108 may sync information between HR server 102-*x* and IM server 106. FIG. 3C is a block diagram of exemplary components of sync server 108 (e.g., functions performed by application 264 in processing logic 220 or stored in memory 260 of sync server 108). As shown in FIG. 3C, sync server 108 includes M human resource (HR) flat files 322-1 through 322-M (individually, "flat file 322-*x*"), an HR database 324, a delta IM database 326 (or "delta database 326"), a parallel IM database (or "parallel DB 328") and sync logic 330. Sync server 108 may include more, fewer, or a different arrangement of components than shown in FIG. 3C.

Flat file 322-*x* may include information output or exported from HR database 302-*x* in HR server 102-*x*. As discussed above, flat file 322-*x* may include comma-separated values, a format which may allow for importing into another database, for example. In this embodiment, HR database 324 may include the information from flat files 322, but in a database format for easier manipulation. FIG. 4B is a block diagram of an exemplary HR database 324. HR database may include an employee ID field 422, an updated field 424, a taxpayer ID field 426, a given name field 428, a family name field 430, and a manager employee ID field 432. HR database 324 may include fewer, more, or a different arrangement of fields than shown in FIG. 4B.

Employee ID field 422 may include information to identify (e.g., uniquely) an employee. Updated field 424 may identify the time (e.g., day and/or time of day) that the information in the record corresponding to the employee ID field 422 was last updated. Taxpayer ID field 426 may identify, for example, the social security number of the corresponding employee. Given name field 428 and family name field 430 may identify the name of the corresponding user. Manager employee ID field 432 may identify the manager of the corresponding employee.

Delta database 326 may be a subset of information from HR database 324. In one embodiment, delta database 326 may include records of employees whose information has changed since the last time sync server 108 updated IM database 312. FIG. 4C is a block diagram of exemplary delta database 326. Delta database 326 may include an employee ID field 442, an updated field 444, a taxpayer ID field 446, a given name field 448, a family name field 450, a manager employee ID field 452, and a manager flag field 454. The information stored in fields 442-454 of delta database 326 may be substantially similar to the type of information stored in the fields of the same name in HR database 324, described above. Delta database 326 may include more, fewer, or a different arrangement of fields than shown in FIG. 4C.

Parallel DB 328 may, for a large part, be a duplicate of IM database 312 stored in IM server 106. In this embodiment, parallel DB 328 may be queried at times to spare IM DB 312 from such queries. FIG. 4D is a block diagram of an exemplary parallel DB 328. Parallel DB 328 may include a user ID field 462, an employee ID field 464, updated field 466, and a roles field 468. Fields 462-468 of parallel database 328 may store substantially the same information as the fields of the same name in IM database 312 described above. Parallel database 328 may also include a manager flag field 472. Manager flag field 472 may indicate whether the corresponding user's manager has a record in parallel DB 328. The default value for flag field 472 may be TRUE. If flag field 472 is set to FALSE, then the link between the user and the user's manager may not be complete in parallel DB 326 or IM database 312. Parallel DB 326 may include more, fewer, or a different arrangement of fields than shown in FIG. 4C.

Returning to FIG. 3C, sync logic 330 may sync information between HR servers 102 and IM server 106. For example, when an employee leaves employment, this information may be conveyed from HR server 102-*x* to IM server 106 through sync server 108. In turn, IM server 106 may revoke privileges granted to the departed employee. As another example, if the identity of an employee's manager changes, then this information may be conveyed from HR server 102-*x* to IM server 106 through sync server 108. In this case, when the employee seeks authorization to access resource server 104-*x*, IM server 106 may send an email to the appropriate manager to grant the authorization.

Figure 5A:
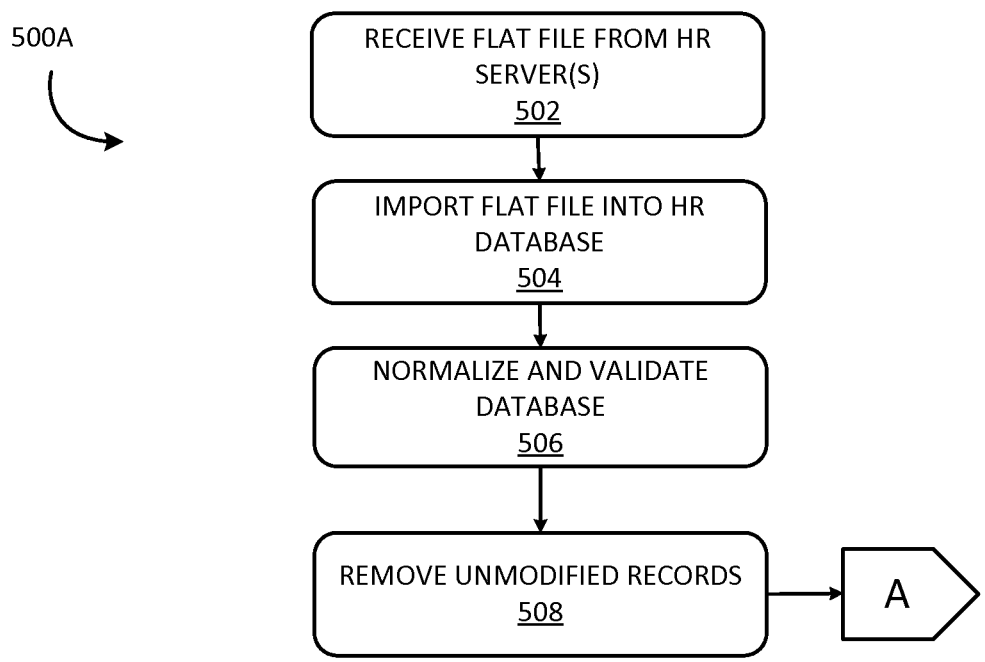
FIGS. 5A through 5E are flowcharts of exemplary processes for syncing information between the HR servers and the identity manager server of FIG. 1.
Figure 5B:
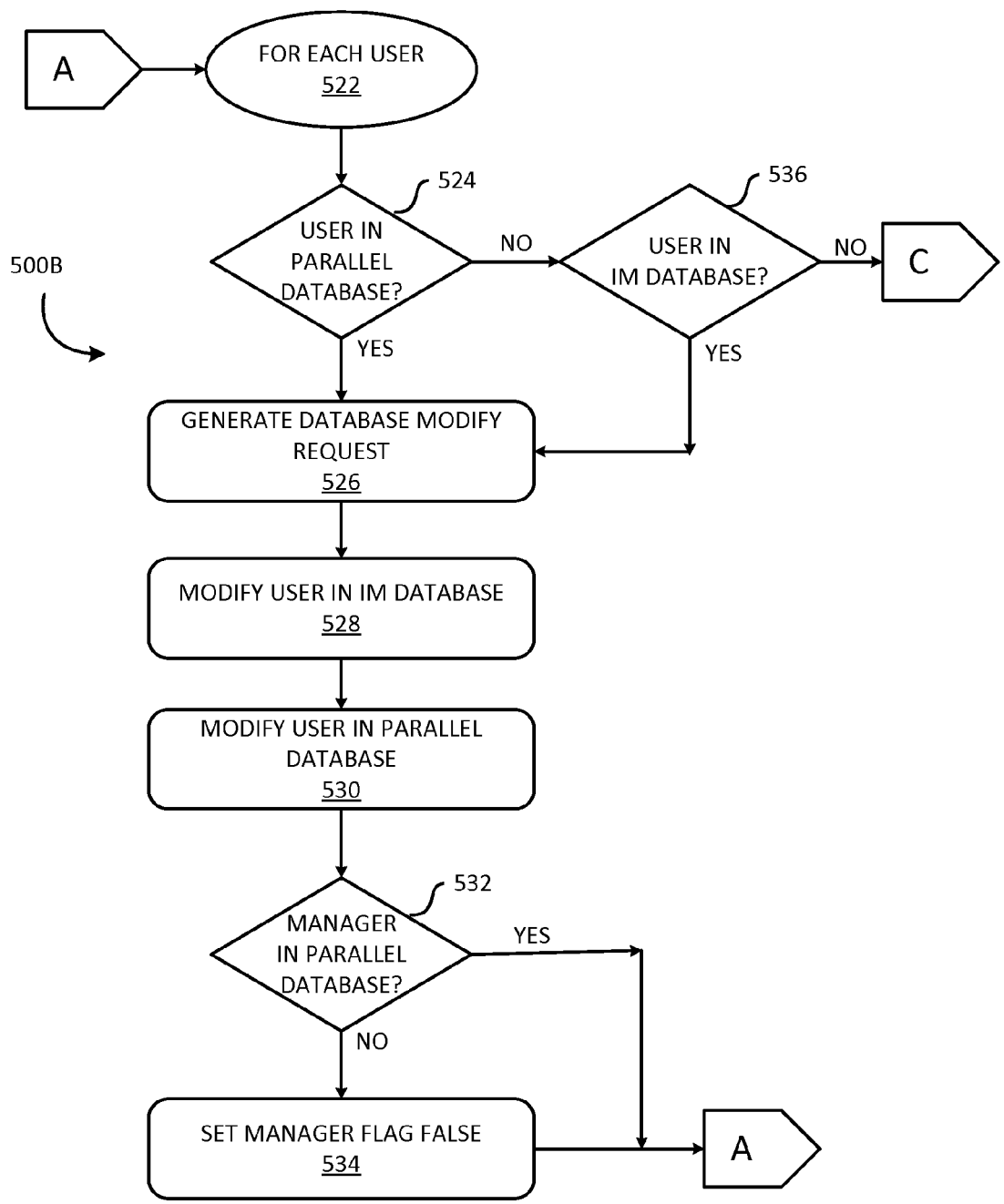
Figure 5C:
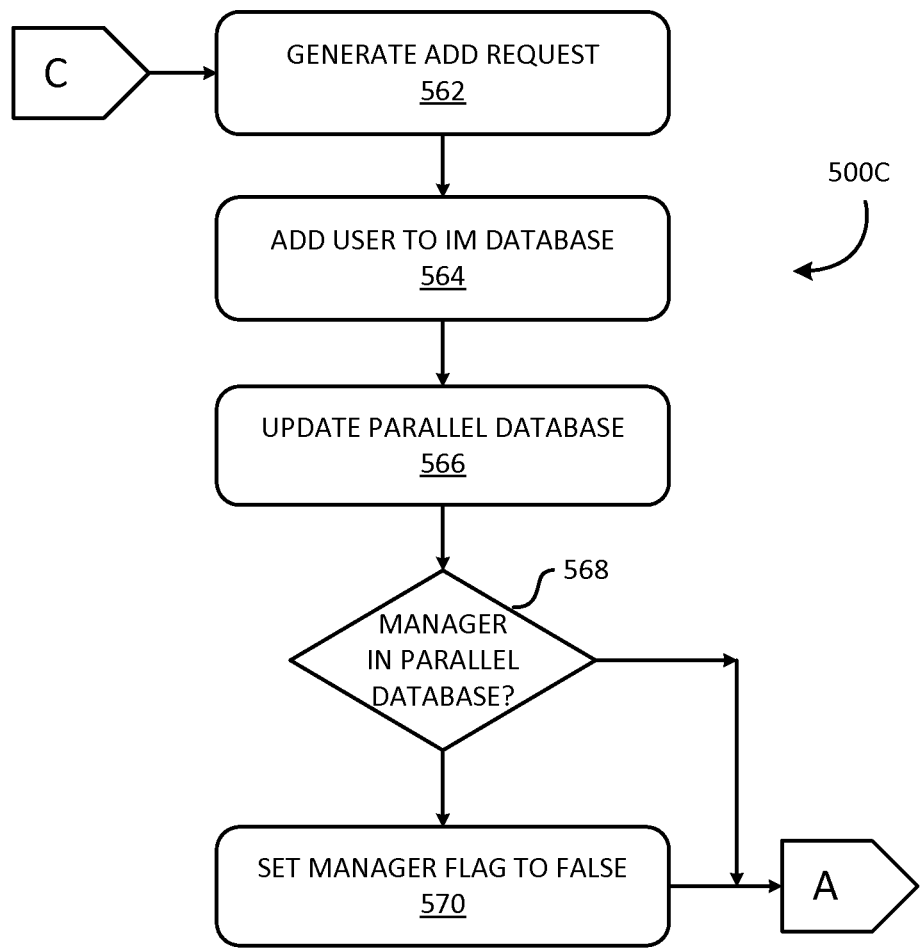
Figure 5D:
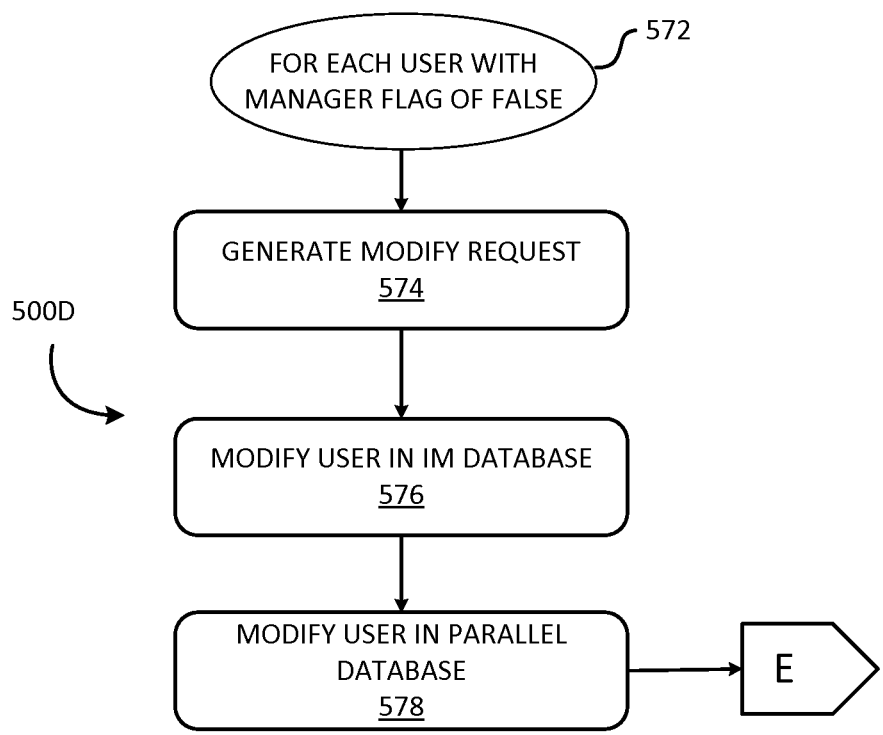
Figure 5E:
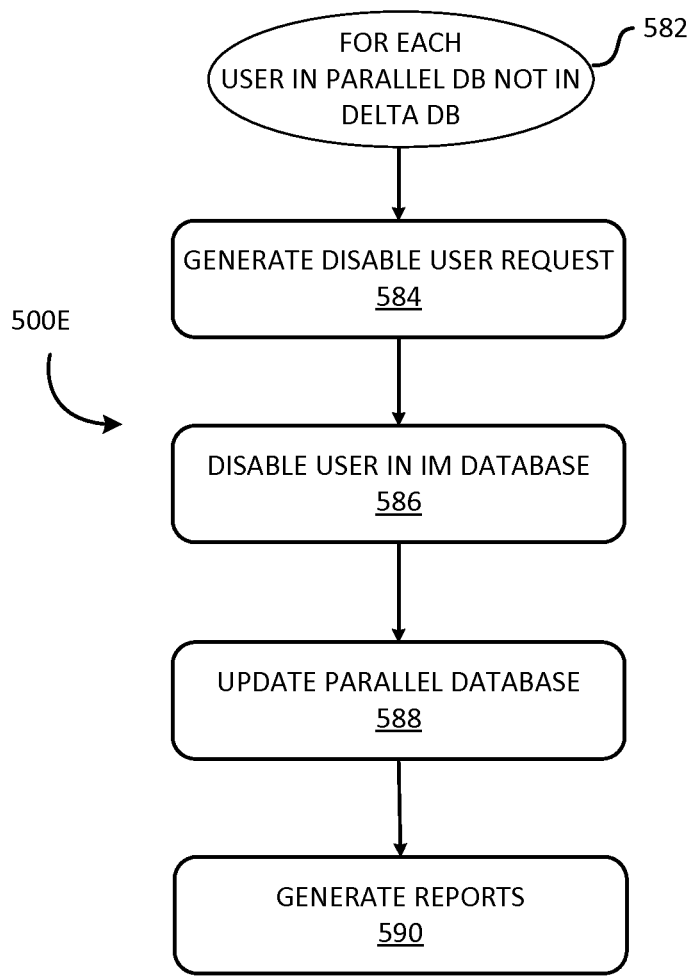

FIG. 5A is a flowchart of a process 500A for syncing information between HR servers 102 and IM server 106. Process 500A may be performed by sync logic 330 in sync server 108. Process 500 A may begin with the creation and receipt of one or more flat files 322 (block 502) from one or more HR servers 102. That is, export logic 304 in HR server 102-*x* may export current human resource information (e.g., for each employee handed by HR server 102-*x*) as a flat file 322-*x* that is transmitted to, received, and stored in sync server 108. For example, in one embodiment, such a flat file may include the information stored in HR database 324 with commas separating fields and records. Exporting information stored in HR database 302 as a flat file (e.g., a comma-separated value file) may allow sync server 108 to operate with any number of HR servers 102, for example, and to combine information from different types of HR servers 102.

The flat files may be imported into a database (block 504). In the current example, flat files 322 may be imported into (e.g., used to create) HR database 324 stored in sync server 108. In this embodiment, information from different HR servers 102 may be combined into a one database (e.g., HR database 324). Importing flat files into a database (e.g., MySQL) may also allow for easier manipulation of data (e.g., compared to a flat file). The information in HR database may be normalized and validated (block 506). For example, citizenship information may be changed, where appropriate, to standard country codes, date fields may be standardized, etc.

Unmodified records may be removed from HR database 324 (block 508) to generate delta database 326. In this embodiment, HR database 324 may include updated field 406 and parallel database may also include updated field 466. For each employee record, for example, if HR database 324 includes a time/date in updated field 406 that is earlier than the information in updated field 466 in parallel database 328, then the record may be discarded. In other words, the information for the employee has not changed and there is no need to update information for the employee in IM server 106. On the other hand, if HR database 324 includes a time/date in updated field 406 that is later than the information in updated field 466 in parallel database 328, then the record may be kept. In other words, the information for the employee has changed since the last update of IM server 106 and the record is kept for further updating IM server 106. In this embodiment, reducing the number of employee records may improve the speed with which sync server 108 updates IM server 106.

For example, parallel database 328 (see FIG. 4D) shows that the records corresponding to user IDs Mary and Chuck were updated on Jan. 31, 2011. Chuck's record in HR database (see FIG. 4B) indicates an update of Jan. 13, 2011. Thus, Chuck's record does not survive to delta database 326. On the other hand, HR database 324 indicates (see FIG. 4B) that Mary's information changed on Feb. 14, 2011. As a result, Mary's record does survive from HR database 324 to delta database 326.

Process 500B may be executed for each record in delta database 326 (block 522) (e.g., for each changed record that requires updating IM server 106). If a corresponding user ID exists in parallel database 328 (block 524: YES), then a database modify request (e.g., an LDAP modify request) may be generated (block 526). Using the generated request, the corresponding user record may be modified (block 528) in IM database 312 in IM server 106. For example, if the user's manager has changed, then this information may be updated in IM database 312 in IM server 106. Likewise, parallel database 328 may be updated (block 530) with the same information, including the time and/or date in updated field 406 indicating that the corresponding record has been updated. Parallel database 328 may be checked (block 532) to determine if the user's manager exists in the database. If the user's manager does not exist in parallel database 328 (block 532: NO), then the manager flag for the user in parallel database 328 may be set to FALSE (block 534). As discussed below, users with a FALSE manager flag may be revisited to ensure the proper link between the employee and the employee's manager. An employee's manager may not be present in parallel database 328 when, for example, the employee's manager is new to the organization and has not yet been added to parallel database 328.

If the user in delta database 326 does not exist in parallel database 328 (block 524: NO), then the user is presumably a new employee. To ensure the parallel database 328 properly reflects IM database 312, IM database 312 (e.g., in IM server 106) may also be checked to determine if the user is in IM database 312 (block 536). If the user is not in IM database 312 (block 536: NO), then the user (e.g., a new employee) may be added to IM database 312 (blocks 562-566). Creating a new user in IM database 312 may include creating an add request (e.g., an LDAP add request) (block 562) and adding the user to IM database 312 (block 564). In addition, parallel database 328 may be updated to include the new user (block 566). Parallel database 328 may also be checked to determine if the user's manager exists (block 568). If the user's manager does not exist in parallel database 328 (block 568: NO), then the manager flag in the user's record in parallel database 328 may be set to FALSE (block 570).

If the user does exist in IM database 312 (block 536: YES), then parallel database 328 is not up-to-date. In this case, IM database 312 may be updated (blocks 526-532) as described above. In addition, the first time process 500 is executed and parallel DB 328 is empty, decision blocks 526-530 allow for parallel database 328 to become populated with the first run of process 500.

As described above, a record in parallel database 328 may include a value of FALSE in manager flag field 472 when the manager does not exist in the database. Process 500D may be executed for all users having the value of FALSE in manager flag field 414. Essentially, a value of FALSE in manager field 414 indicates that the manager was not present in parallel database 328 when updating the user. In this case, the proper link between the user and the user's manager may not have been properly created. Thus, a modify request may be generated (e.g., an LDAP modify request) (block 574) to update (block 576) manager ID field 412 in IM database 312. As well as updating IM database 312, parallel DB 328 may be updated as well. Process 500D may repeat and continue until no records with FALSE in manager flag field 414 exist.

As noted above, if an employee leaves employment, then sync logic 330 (e.g. process 500E) may update IM database 312 accordingly. Process 500E may be executed for all users in parallel database 328 but not in delta database 326. In this case, an employee has been removed from HR servers 102 and has presumably left employment. Thus, a request to disable a user from accessing network resources (e.g., an LDAP request) may be created (block 584). The user record may then be removed from IM database 312 (block 586). Likewise, the parallel database 588 may be updated as well (block 588).

Upon completion of processes 500A through 500E, reports may be generated (block 590). A report may include the number of records in IM database 312 that have been updated, for example. A report may also include the number of employees that have left employment.

While the examples of embodiments above relate to employees of a business concern, the embodiments also apply to members of any type of organization or members affiliated with an organization. Members themselves may be people or other organizations. In fact, employees of a business concern may be considered members of an organization (e.g., the business concern).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
   storing, in a computer-readable medium, a first database including a first plurality of user identifiers (IDs) and corresponding privileges for accessing network resources associated with an organization;
   storing, in the computer-readable medium, a second database, different than the first database, including the first plurality of user IDs and the corresponding privileges for accessing the network resources associated with the organization;
   storing, in the computer-readable medium, a third database, different than the first database and second database, including a second plurality of user IDs associated with the organization;
      wherein the second plurality of user IDs stored in the third database identifies users that should have access to at least one of the network resources associated with an organization and wherein the third database does not store user IDs of any user that should not have access to the at least one of the network resources, or
      wherein the third database is not configured to store the corresponding privileges associated with each of the first plurality of user IDs for accessing the network resources associated with the organization;
   comparing the first plurality of user IDs stored in the second database with the second plurality of user IDs stored in the third database to determine a subset of the first plurality of user IDs that appear in the second database but not in the third database; and
   removing, from the first database, privileges associated with the subset of the first plurality of user IDs, that results from the comparing, that appear in the second database but not in the third database.

2. The computer-implemented method of claim 1, wherein the third database is configured to store a human resources database.

3. The computer-implemented method of claim 1, wherein storing the second database includes storing, in the second database, for each of the first plurality of user IDs, an indication of a time information stored in the first database associated with a same user ID was last updated.

4. The computer-implemented method of claim 3, wherein storing the third database includes storing, in the third database, for each of the plurality of user IDs, an indication of a time information stored in the third database for the corresponding user ID was last updated.

5. The computer-implemented method of claim 4, further comprising updating, for each of the first plurality of user IDs, information stored in the first database with information stored in the third database with a same user ID, when the information stored in the third database, as indicated by the time stored in the second database, was updated more recently than the information stored in the first database.

6. The computer-implemented method of claim 4,
   wherein storing the first database includes storing, in the first database for each of the first plurality of user IDs, a supervisory user ID associated with approving the privileges associated with the corresponding user ID; and
   wherein storing the third database includes storing, in the third database for each of the second plurality of user IDs, a supervisory user ID associated with approving privileges associated with each user ID.

7. The computer-implemented method of claim 6, wherein updating information stored in the first database includes:
   updating, for each of the first plurality of user IDs in the first database, the supervisory user ID with the supervisory user ID stored in the third database having a same user ID.

8. The computer-implemented method of claim 1, further comprising:
   generating a plurality of flat files from a plurality of databases, wherein each of the plurality of databases includes information regarding members associated with the organization; and
   combining the plurality of flat files into the third database, wherein each member is associated with one of the second plurality of user IDs.

9. A computer-implemented method comprising:
   storing, in a computer-readable medium, a first database including a first plurality of user identifiers (IDs) and corresponding privileges for accessing network resources associated with an organization;
   storing, in the computer-readable medium, a second database, different than the first database, including the first plurality of user IDs and the corresponding privileges for accessing network resources associated with the organization, wherein storing the second database includes storing, in the second database, for each of the first plurality of user IDs, an indication of a time information stored in the first database associated with a same user ID was last updated;
   storing, in the computer-readable medium, a third database, different than the first database and second database, including a second plurality of user IDs associated with the organization, wherein storing the third database includes storing, in the third database, for each of the plurality of user IDs, an indication of a time information stored in the third database for the corresponding user ID was last updated;
      wherein the third database is not configured to store the corresponding privileges associated with each of the first plurality of user IDs for accessing the network resources associated with the organization, or
      wherein the second plurality of user IDs stored in the third database identifies users that should have access to at least one of the network resources associated with an organization and wherein the third database does not store user IDs of any user that should not have access to the at least one of the network resources;
   comparing, for each of the first plurality of user IDs, the indication of the time stored in the second database with the indication of the time stored in the third database for the corresponding user ID to determine whether information stored in the third database was updated more recently than the information stored in the first database; and
   updating, for each of the first plurality of user IDs, information stored in the first database with information stored in the third database with a same user ID, when, as a result of the comparing, the information stored in the third database was updated more recently than the information stored in the first database.

10. The computer-implemented method of claim 9,
wherein storing the first database includes storing, in the first database for each of the first plurality of user IDs, a supervisory user ID associated with approving the privileges associated with the corresponding user ID; and
wherein storing the third database includes storing, in the third database for each of the second plurality of user IDs, a supervisory user ID associated with approving privileges associated with each user ID.

11. The computer-implemented method of claim 10, wherein updating information stored in the first database includes:
updating, for each of the first plurality of user IDs in the first database, the supervisory user ID with the supervisory user ID stored in the third database having a same user ID.

12. The computer-implemented method of claim 10, further comprising:
generating a plurality of flat files from a plurality of databases, wherein each of the plurality of databases includes information regarding members associated with the organization; and
combining the plurality of flat files into the third database, wherein each member is associated with one of the second plurality of user IDs.

13. A system comprising:
one or more network devices including a memory to store:
a first database to store a first plurality of user identifiers (IDs) and corresponding privileges to access network resources associated with an organization;
a second database, different than the first database, to store the first plurality of user IDs and the corresponding privileges to access the network resources associated with the organization;
a third database, different than the first database and second database, to store a second plurality of user IDs associated with the organization;
wherein the second plurality of user IDs stored in the third database identifies users that should have access to at least one of the network resources associated with an organization and wherein the third database does not store user IDs of any user that should not have access to the at least one of the network resources, or
wherein the third database is not configured to store the corresponding privileges associated with each of the first plurality of user IDs for accessing the network resources associated with the organization; and a processor to:
compare the first plurality of user IDs stored in the second database with the second plurality of user IDs stored in the third database to determine a subset of the first plurality of user IDs that appear in the second database but not in the third database; and
remove, from the first database, privileges associated with the subset of the first plurality of user IDs, as a result of the processor comparing, that appear in the second database but not in the third database.

14. The system of claim 13,
wherein the third database is configured to store a human resources database.

15. The system of claim 13, wherein the second database includes, for each of the first plurality of user IDs, an indication of a time information stored in the first database and associated with a same user ID was last updated.

16. The system of claim 15, wherein the third database includes, for each of the plurality of user IDs, an indication of a time information stored in the third database for the corresponding user ID was last updated.

17. The system of claim 16, wherein the processor is further configured to update, for each user ID, information stored in the first database with information stored in the third database with a same user ID, when the information stored in the third database, as indicated by the time stored in the second database, was updated more recently than the information stored in the first database.

18. The system of claim 13,
wherein the first database includes, for each of the first plurality of user IDs, a supervisory user ID associated with approving the privileges associated with the corresponding user ID; and
wherein the third database includes for each of the second plurality of user IDs, a supervisory user ID associated with approving privileges associated with each user ID.

19. The system of claim 18, wherein the processor is configured to update, for each of the first plurality of user IDs in the first database, the supervisory user ID stored in the first database with the supervisory user ID stored in the third database having a same user ID.

20. The system of claim 13, wherein the processor is configured to:
generate a plurality of flat files from a plurality of databases, wherein each of the plurality of databases includes information regarding members associated with the organization; and
combine the plurality of flat files into the third database, wherein each member is associated with one of the second plurality of user IDs.

* * * * *